3,345,331
POLY[ETHYLENE TEREPHTHALATE/4-(3-OXYPROPOXY)BENZOATE]
Millard Griffin Reese, Jr., Kinston, N.C., assignor to E. I. du Pont de Nemours and Company, Wilmington, Del., a corporation of Delaware
No Drawing. Filed Nov. 18, 1963, Ser. No. 324,201
2 Claims. (Cl. 260—47)

This invention relates to a novel copolymeric modification of polyethylene terephthalate, and to fibers, films, and other shaped articles produced from the novel copolyester.

Fibers of polyethylene terephthalate have achieved wide commercial success owing to their adaptability for preparing "wash-and-wear" fabrics requiring only minimum care. Copolyesters have also been suggested from time to time involving substitution of some of the repeating ethylene terephthalate structural units in the polymer by repeating units derived from other glycols, dicarboxylic acids, or hydroxyacids. The addition of a copolymeric component has been found to result in considerable modification of the properties of the polyethylene terephthalate. A desirable effect is a marked improvement in dyeability; however, fibers of the copolyesters exhibit poorer performance in wash-and-wear fabrics than fibers of polyethylene terephthalate, and many other properties of the fibers are adversely affected. In particular, it has been found the ability of the fibers to withstand treatment at high temperature is reduced by the presence of the copolymeric component. In general, high shrinkage is encountered when the copolyester fibers are subjected to fabric treatments at temperatures on the order of 196° C.

A copolyester of polyethylene terephthalate has now been found which can be formed into fibers displaying enhanced dyeability as contrasted with fibers of polyethylene terephthalate while yet retaining the ability to withstand treatment at high temperature and exhibiting other desirable physical properties of polyethylene terephthalate fibers. The novel product is a copolyester derived from ethylene glycol, terephthalic acid, and 4-(3-hydroxypropoxy)benzoic acid. More specifically, the invention comprises a novel linear copolyester formed from reactants consisting essentially of (a) ethylene glycol and (b) a mixture of acids comprising 75 to 95 mol percent terephthalic acid and 25 to 5 mol percent 4-(3-hydroxypropoxy)benzoic acid, the mol percentages of said acids totalling 100 mol percent. For production of fibers, the polyester has an intrinsic viscosity, measured in solution at 25° C. in one part by volume of trifluoroacetic acid and three parts by volume of methylene chloride, of at least 0.3. Also contemplated in accordance with the invention are fibers, films, and other shaped articles of outstanding properties prepared from the novel copolyester.

It is surprising that a polyethylene terephthalate copolyester fiber having good resistance to high temperature can be formed using 4-(3-hydroxypropoxy)benzoic acid as the copolymeric component while the use of even such a similar copolymeric component as 4-(2-hydroxyethoxy)benzoic acid yields fibers of poor resistance to high temperature heat treatment; although 4-(2-hydroxyethoxy)benzoic acid and 4-(3-hydroxypropoxy)benzoic acid are homologous hydroxyacids and it might be expected that their copolyesters would be quite similar in properties.

The novel copolyester may be characterized alternatively as a linear polymer consisting essentially of a succession of recurring structural units represented by the formulas:

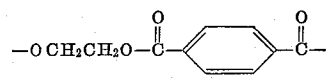

(Formula A)

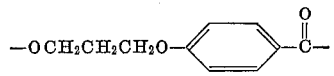

(Formula B)

wherein the ratio of said units (Formulas A and B) is preferably in the range of 75/25 to 95/5, respectively.

A convenient method for preparing the copolyesters of the invention involves reaction of the ethylene glycol with a mixture of the dimethyl esters of the acids in the desired proportion in an ester interchange reaction followed by polycondensation at high temperature and at low partial pressure of the glycol, until a polymer of the desired molecular weight is produced. In carrying out the ester interchange reaction, at least one molecular proportion of glycol per molecular proportion of the mixed esters should be used, preferably about 1.5 to 2.1 mols of glycol per mol of the esters. It is advantageous to employ catalysts to accelerate the rate of reaction, and it has been found that manganous acetate, calcium acetate, and sodium methoxide are suitable ester interchange catalysts while antimony trioxide, litharge, and the tetra-alkyl titanates such as tetraisopropyl titanate are suitable polycondensation catalysts.

Instead of reacting the ethylene glycol with dimethyl terephthalate and methyl 4-(3-hydroxypropoxy)benzoate, other esters of the acids may be used, especially other lower alkyl esters, phenyl esters, or the like. The copolyesters may also be prepared by reacting the mixture of acids directly with the ethylene glycol, or with esters of the glycol with acetic acid or other lower aliphatic acids. Other equivalent methods, such as employing ethylene oxide in the place of ethylene glycol, may be employed so long as the end product copolyester has the composition essentially derived from ethylene glycol, terephthalic acid, and 4-(3-hydroxypropoxy)benzoic acid.

The novel copolyester may be melt spun by conventional methods to form fibers. In order to achieve good resistance to treatment at high temperature, the fibers should be oriented and crystallized to a tenacity at break of at least about 2.5 g.p.d., a crystallinity index of at least about 12, and a birefringence of at least about 0.16. Fibers having this structure exhibit excellent dyeability and also exhibit physical properties comparable to those of polyethylene terephthalate fibers, including absolute shrinkage values at 196° C. which are not more than about 5% higher than the absolute shrinkage value for comparable fibers of polyethylene terephthalate homopolyester.

Copolymeric compositions are specified herein by listing the respective mol percentage values for each constituent of the mixed components. For instance, poly[ethylene terephthalate/4-(3-oxypropoxy)benzoate] (85/

15) represents a copolyester derived from 0.85 mol of the ethylene glycol ester of terephthalic acid and 0.15 mol of 4-(3-hydroxypropoxy)benzoic acid.

Appended below is an example which will serve further to illustrate the invention; however, it is not intended to be limitative.

The term "intrinsic viscosity," as used herein, is defined as the limit of the fraction $\ln(r)/c$, as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

EXAMPLE

A mixture of 2.1 mols of ethylene glycol, 0.9 mol of dimethyl terephthalate, 0.1 mol of methyl 4-(3-hydroxypropoxy)benzoate, and a catalyst mixture comprising 0.000259 mol of manganous acetate and 0.000102 mol of antimony trioxide is added to a polymerization tube. The tube is heated under atmospheric pressure, with evolution of methanol, the final temperature being about 225° C. After completion of this ester exchange reaction, the pressure is reduced to approximately 0.3 mm. of mercury and the temperature is raised to 275° C., after which polycondensation is carried out for 3 hours with evolution of excess glycol. The product is poly[ethylene terephthalate/4-(3-oxypropoxy)benzoate] (90/10) having an intrinsic viscosity of 0.58. Using conventional equipment, the product is press spun into filaments and drawn 4.4X over a 100° C. pin. The drawn yarn has a drawn denier per filament of 7.9 (0.9 tex), a tenacity of 3.0 g.p.d., an elongation of 24%, and an initial modulus of 106 g.p.d. The filaments are heat-treated by boiling them in water for 15 minutes, heating them in an oven at 180° C. for 3 minutes, and finally immersing them in boiling water again for 15 minutes. The heat-treated yarn has a tenacity of 2.7 g.p.d., an elongation of 34%, and an initial modulus of 70 g.p.d.

For comparative purposes, the experiment is repeated with omission of the methyl 4-(3-hydroxypropoxy)benzoate to prepare filaments of polyethylene terephthalate homopolymer. In another experiment, another control yarn is prepared by repeating the above experiment with substitution of methyl 4-(2-hydroxyethoxy)benzoate for the methyl 4-(3-hydroxypropoxy)benzoate to yield filaments of poly[ethylene terephthalate/4-(2-oxyethoxy)benzoate] (90/10). The drawn yarns so obtained are then heated at 196° C. for 15 minutes to compare their resistance to high temperature heat treatment. The results are shown in the following table.

*Comparative experiment treatment of yarns at 196° C.*

| Polymer composition of yarn: | Shrinkage at 196° C. % |
|---|---|
| Polyethylene terephthalate | 21.5 |
| Poly[ethylene terephthalate/4-(3-oxypropoxy)benzoate] (90/10) | 22.4 |
| Poly[ethylene terephthalate/4-(2-oxyethoxy)benzoate] (90/10) | 30.0 |

As shown in the table, modification of polyethylene terephthalate with 4-(3-hydroxypropoxy)benzoic acid results in very little change in the 196° C. shrinkage of the yarn, i.e., the value 22.4 is only about 4% greater than the value 21.5, while modification with 4-(2-hydroxyethoxy)benzoic acid yields yarn having a 196° C. shrinkage value about 40% greater than 21.5, typical of the poor response to heat treatment shown by most polyethylene terephthalate copolyester yarns.

Drawn poly[ethylene terephthalate/4-(3-oxypropoxy)-benzoate] (90/10) yarn prepared as described above has a birefringence of about 0.2 (Berek compensator value). It has a crystallinity index of about 15, determined in accordance with the method described by Statton in Journal of Applied Polymer Science, vol. 7, pp. 803–815 (1963), employing an amorphous, unoriented film of polyethylene terephthalate as a standard for minimum crystallinity and the same film heated at 245° for 65 hours in air as a standard for maximum crystallinity.

The fibers are dyed, employing an aqueous bath containing 20% (based on the weight of the fiber) of a yellow disperse dye comprising 3'-hydroxyquinophthalone at 100° C. for 90 minutes, using a 1000 to 1 ratio of bath to fiber. Fibers of the novel copolyester of the invention yield a medium shade of yellow, markedly deeper than fibers of unmodified polyethylene terephthalate control yarn dyed under the same conditions. Fiber samples removed from the dyebath at intervals of 9, 16, and 25 minutes are rinsed, dried, and then analyzed quantitatively for percentage dye adsorbed by extracting the dye with hot chlorobenzene and determining the amount of dye spectrophotometrically. A plot of the amount of dye adsorbed per gram of fiber vs. the square root of time shows that the dye rate (slope of the line connecting the points) of poly[ethylene terephthalate/4-(3-oxypropoxy)-benzoate] (90/10) is 1.7 times the dye rate of polyethylene terephthalate.

The ability of a fiber to recover from low levels of extension, as measured by its modified tensile strain recovery (MTSR), has been found to correlate well with its wash-and-wear performance in the form of fabrics prepared from the yarn. The MTSR of poly[ethylene terephthalate/4-(3-oxypropoxy)benzoate] (90/10) fiber is found to be 76% which compares very favorably with the MTSR of unmodified polyethylene terephthalate fiber, 80%.

Defined more specifically, the MTSR of a fiber sample is determined by mounting a 10-inch length of the sample (either a yarn or a single filament) on a tensile tester (commercially available from the Instron Engineering Corporation, Quincy, Massachusetts). The sample is initially dried on the tensile tester in a slack condition for 4 minutes at 80° C., cooled for 1 minute, immersed in a water bath maintained at 40° C. for a period of 2 minutes, and subsequently stretched in the water bath at an elongation rate of 1 inch per minute. Upon reaching the desired total elongation, the sample is held at constant length for an additional 2 minutes and the water bath is removed. The load on the sample is then reduced to a value of 0.042 g.p.d., and the sample is allowed to retract while again being dried at a temperature of 80° C. for 4 minutes: the heater is then removed and the sample cooled for an additional 1 minute, after which the final length of the sample is measured. Percent recovery is calculated from the formula:

$$\frac{\text{Units of retraction}}{\text{Units of elongation}} \times 100$$

This procedure is carried out for elongations of 0.5, 1, 2, and 3%, and a graph is prepared by plotting the percent recovery against total elongation in the range 0–3%. MTSR values are average per cent recovery values from the range 0–3% elongation which may be determined from the graph by usual graphical averaging procedures.

Since many different embodiments of the invention may be made without departing from the spirit and scope thereof, it is to be understood that the invention is not limited by the specific illustrations except to the extent defined in the following claims.

I claim:
1. The copolyester characterized as a linear polymer consisting essentially of a succession of recurring structural units represented by the formulas:

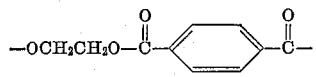

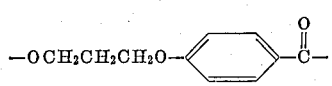

wherein the ratio of said units is within the range of 75/25 to 95/5, respectively.

2. A fiber of the linear copolyester as defined in claim 1 and having an intrinsic viscosity of at least 0.3, measured in solution at 25° C. in one part by volume of trifluoroacetic acid and three parts by volume of methylene chloride.

References Cited
UNITED STATES PATENTS

| | | |
|---|---|---|
| 2,471,023 | 5/1949 | Cook et al. |
| 2,692,248 | 10/1954 | Lincoln. |
| 2,692,249 | 10/1954 | Lincoln. |
| 3,033,822 | 5/1962 | Kibler et al. _____ 260—47 |

WILLIAM H. SHORT, *Primary Examiner.*

LOUISE P. QUAST, *Assistant Examiner.*